United States Patent [19]

Matusima et al.

[11] Patent Number: 4,900,907
[45] Date of Patent: Feb. 13, 1990

[54] OPTICAL INFORMATION READING APPARATUS

[75] Inventors: Takesi Matusima, Nagoya; Atutosi Okamoto, Chita, both of Japan

[73] Assignee: Nippondenso Co., Ltd., Kariya, Japan

[21] Appl. No.: 28,646

[22] Filed: Mar. 18, 1987

[30] Foreign Application Priority Data

Mar. 18, 1986 [JP] Japan .................................. 61-60376
Sep. 4, 1986 [JP] Japan ................................ 61-208783

[51] Int. Cl.⁴ ............................................. G06K 7/10
[52] U.S. Cl. .................................... 235/472; 235/454; 235/462
[58] Field of Search ................ 235/454, 462, 472, 463

[56] References Cited

U.S. PATENT DOCUMENTS

| | | | |
|---|---|---|---|
| 3,918,028 | 11/1975 | Humphrey et al. | 235/472 |
| 4,210,802 | 7/1980 | Sakai | 235/472 |
| 4,408,120 | 10/1983 | Hara et al. | 235/462 |
| 4,409,470 | 10/1983 | Shepard et al. | 235/472 |
| 4,488,678 | 12/1984 | Hara et al. | 235/463 |
| 4,516,017 | 5/1985 | Hara et al. | 235/472 |
| 4,528,444 | 7/1985 | Hara et al. | 235/462 |
| 4,538,060 | 8/1985 | Sakai et al. | 235/472 |
| 4,603,262 | 7/1986 | Eastman et al. | 235/472 |
| 4,694,182 | 9/1987 | Howard | 235/472 |

FOREIGN PATENT DOCUMENTS 60-171581 9/1985 Japan .

Primary Examiner—A. D. Pellinen
Assistant Examiner—Jeffrey A. Gaffin
Attorney, Agent, or Firm—Cushman, Darby & Cushman

[57] ABSTRACT

A handheld reader for reading optical information such as a bar code contains a reading sensor. An image of the optical information is imaged by light reflected from the optical information, via a reflecting mirror, a lens and a diaphram member, onto the reading sensor so that the image is converted into an electric signal. A pair of LEDs are disposed on both sides of the image sensor so that the images thereof are imaged near the optical information by light from the LEDs through the diaphram member, the lens and the reflecting mirror. The LEDs and reading sensor are controlled so that the LEDs are disabled from emitting light while the reading sensor performs the reading operation of the optical information. Instead of LEDs, optical fibers can be used.

14 Claims, 7 Drawing Sheets

OPTICAL INFORMATION READING APPARATUS

BACKGROUND OF THE INVENTION

The present invention relates to reading apparatus for reading optically readable information such as a bar code or characters printed on a record medium such as a label or the like.

As general background art, reference may be made to U.S. Pat. Nos. 4,408,120, 4,488,678, 4,516,017, 4,528,444 and 4,538,060 and the U.S. patent application Ser. No. 693,825 of Hara et al filed Jan. 23, 1985 and now abandoned.

Conventional apparatus of this type is disclosed in a Japanese patent application having a laid-open patent No. 60-171581 published Sept. 5, 1985. That patent application discloses information reading apparatus in which illuminating means illuminates a label on which optically readable information such as a bar code or characters is printed so that an image of the information in light reflected therefrom is imaged onto a reading sensor for converting the image into an electric signal by an electronic scanning operation.

In this kind of conventional apparatus, however, it is difficult to determine what part of the label is scanned or whether the apparatus is operating in focus. This results in not being able to read the information correctly. For example, in a case where a line to be scanned on the label is not illuminated enough by illuminating means when an opening of a handheld reader faces the label, or where optical means and the reading sensor for imaging the optical information are out of focus, the optically readable information can not be read correctly.

SUMMARY OF THE INVENTION

According to the present invention, light emitting means is positioned on substantially the same plane as a light receiving plane of the reading sensor and emits light to image an image thereof near the optically readable information. Therefore, it is easy to determine whether the apparatus operates in focus or not by the focus condition of the image of light emitting means.

Further, the light emitting means includes a pair of light emitting parts positioned on both sides of a reading portion of the reading sensor. Therefore, it is easy to determine what part of a record medium containing the information is scanned.

Still further, disable means prevents the light emitting means from emitting light while the reading sensor performs the reading operation of the information. Therefore, the reading sensor can work correctly since there is no effect by light from the light emitting means while performing the reading operation.

BRIEF DESCRIPTION OF THE DRAWINGS

These and other objects and advantages of this invention will become more apparent and more readily appreciated from the following detailed description of the presently preferred exemplary embodiments of the invention taken in conjunction with the accompanying drawings, of which.

DETAILED DESCRIPTION OF THE PREFERRED EMBODIMENTS

The present invention will now be described hereunder with reference to the preferred embodiments thereof.

Figure 1:
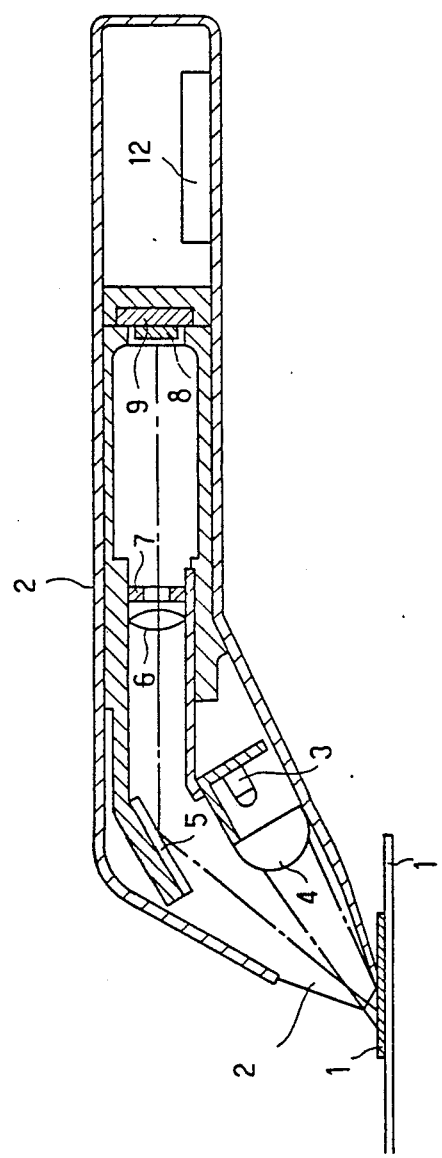
FIG. 1 is a side sectional view showing the first embodiment of an optical reading apparatus according to the present invention.
Figure 2:
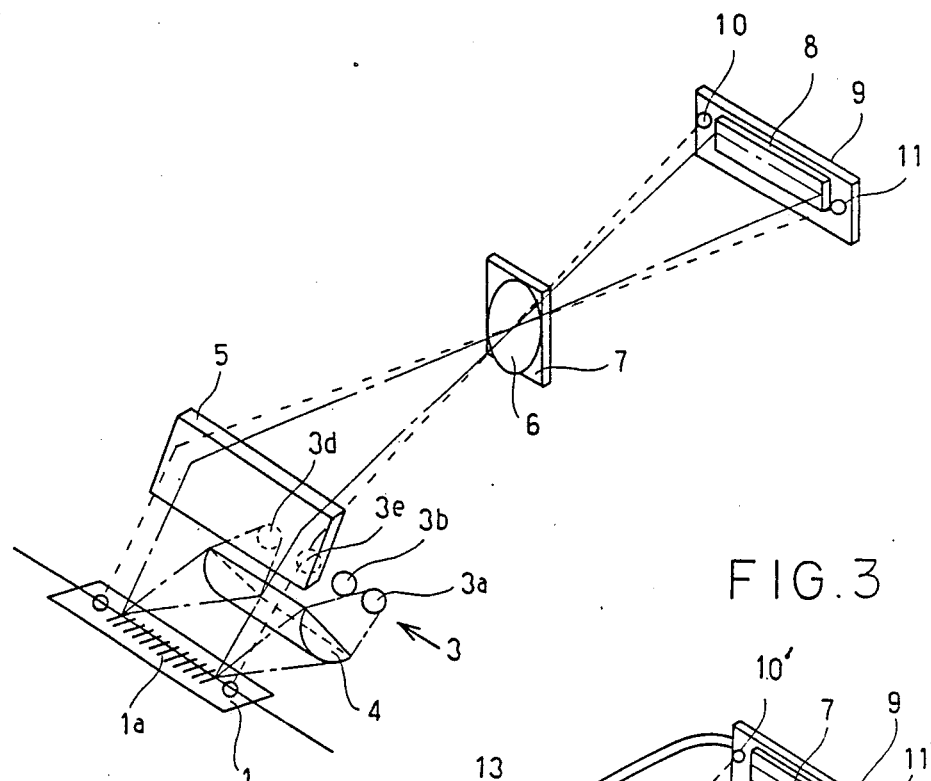
FIG. 2 is a schematic diagram of the apparatus shown in FIG. 1.

FIGS. 1 and 2 refer to a handheld reader which forms part of an information reading apparatus. In FIGS. 1 and 2, a bar code label 1 contains a convential bar code 1a having black bars and white bars which are all parallel to each other. The handheld reader has a casing 2 having an opening 2a at one end thereof to face bar code 1a. The reader includes within casing 2 a light source 3 having four LEDs 3a through 3d for illuminating bar code label 1, and a semicylindrical lens 4 for condensing light from light source 3 so that the light is incident on bar code label 1 after being condensed. Reflecting mirror 5 reflects light reflected from bar code 1a in a predetermined direction, i.e., toward a reading sensor 8. The light reflected from reflecting mirror 5 is transmitted through lens 6 and diaphram member 7 which has an elongate slit arranged so that its longitudinal direction is perpendicular to a scanning line of reading sensor 8. From diaphram member 7 the light goes on to reading sensor 8 where an image of bar code 1a to be scanned is imaged thereon. The reading sensor 8 uses a one-directional image sensor, having a reading portion to which light is incident, which converts the image on the scanning line where photoelements thereof are in line into an electric signal by an electronic scanning operation. This reading sensor 8 is disposed on a circuit board 9 which is fixed to casing 2. At both ends of image sensor 8, LEDs 10 and 11 are disposed on circuit board 9. LEDs 10 and 11 are positioned on the scanning line of reading sensor 8 so that the images of LEDs 10 and 11 are imaged on both ends of bar code 1a in cooperation with diaphram member 7, lens 6 and reflecting mirror 5. Reading sensor 8, LEDs 10 and 11 are electrically controlled by a control circuit 12.

Operation of the above-described embodiment is described next.

LEDs 10 and 11 emit light. The light is transmitted through diaphram member 7, lens 6 and reflecting mirror 5 to bar code label 1, whereby the images of LEDs 10 and 11 are imaged on bar code label 1. Since LEDs 10 and 11 are positioned on the scanning line of reading sensor 8, a line connecting between the images of LEDs 10 and 11 corresponds to the scanning line of reading sensor 8. Therefore, placing bar code 1a between the images of LEDs 10 and 11 means that the image of bar code 1a is surely imaged on the scanning line of reading sensor 8. Accordingly, the handheld reader is positioned so that bar code 1a is between the images of LEDs 10 and 11 as shown in FIG. 2.

Bar code label 1 is illuminated by light from light source 3 through lens 4. From the relationship between the area illuminated by light source 3 and bar code 1a positioned between the images of LEDs 10 and 11, it can be determined that light source 3 and lens 4 are correctly positioned so that the area to be scanned is properly illuminated because the line connecting the images of LEDs 10 and 11 corresponds to the scanning line of reading sensor 8. If bar code 1a is properly positioned between the images of LEDs 10 and 11, then the handheld reader is correctly disposed for reading purposes.

On the other hand, the images of LEDs 10 and 11 suggest the focus condition of the image of bar code 1a imaged on reading sensor 8, because LEDs 10 and 11 are located substantially on the same plane as a light receiving plane of reading sensor 8. If the focus of the images of LEDs 10 and 11 looks correct to the operator, then the focus of the image of the bar code 1a on the reading sensor 8 will be correct. It is not necessary for the nose of the reader to touch the label 1 but can be from 0 to 3 cm. or so therefrom. The LED images on the label are in focus when they are clear, and if not clear the reader may be moved toward or away from the label to make them more clear. Of course, focus could be determined also or alternatively by judging the diameter of the LED images on the label, and if desired pre-printed circles could be put on the labels for such a purpose.

Bar code 1a reflects the light from light sources 3. Since bar code 1a is printed in white and black bars which are contrasting colors in light reflectivity, the reflected light therefrom has corresponding light densities. The reflected light, passing via reflecting mirror 5, lens 6 and diaphram member 7 is received by reading sensor 8 on the scanning line thereof, whereby an image of bar code 1a is imaged on the scanning line where photoelements of reading sensor 8 are in line. Reading sensor 8 which is activated by control circuit 12 converts the image into an electric signal by the electronic scanning operation thereof.

Figure 3:
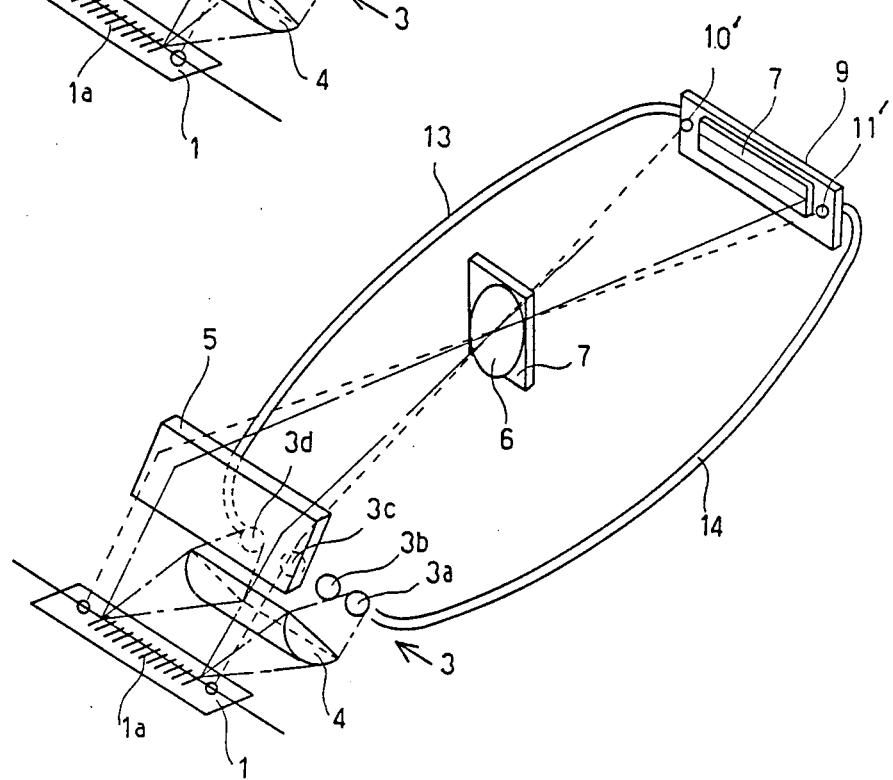
FIG. 3 is a schematic diagram showing a second embodiment according to the present invention.

The second embodiment of the present invention is shown in FIG. 3. In this embodiment, instead of LEDs 10 and 11 as in the first embodiment, optical fibers 13 and 14 are provided for leading light from light source 3 and emitting the led light from its ends 10' and 11' at opposite sides of reading sensor 8. Again the light providing ends 10' and 11' are on the scanning line of reading sensor 8.

Figure 4:
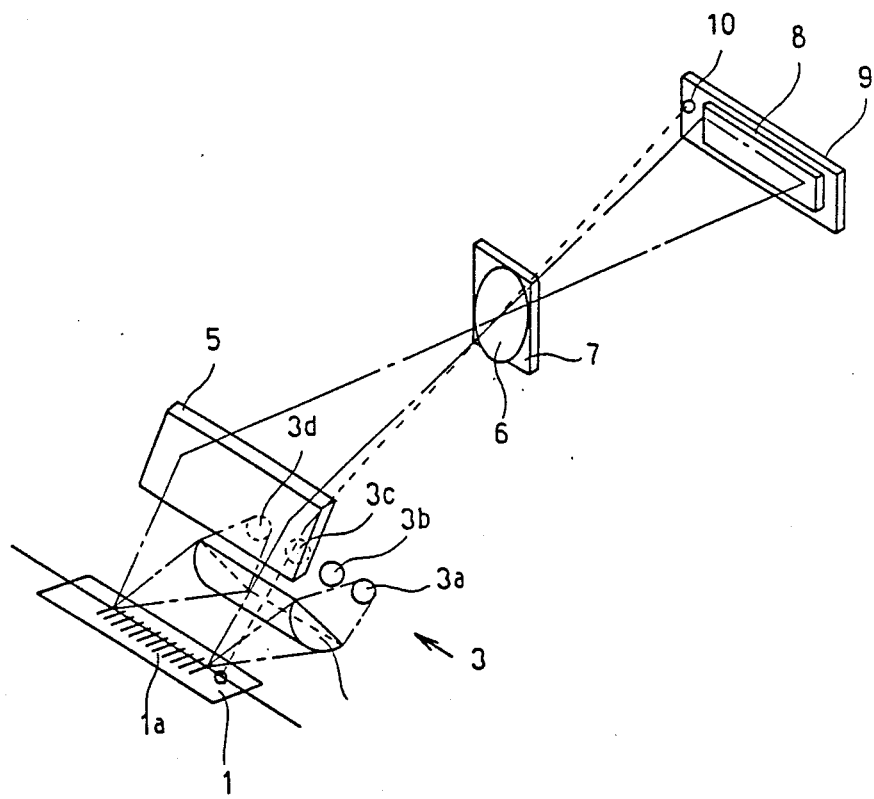
FIG. 4 is a schematic diagram showing a third embodiment according to the present invention.

The third embodiment of the present invention is shown in FIG. 4. In this embodiment, only one LED 10 is disposed on circuit board 9, i.e., at only one end thereof, to determine whether the handheld reader operates in focus or not. Of course, one of the optical fibers of FIG. 3 could replace the LED 10 in FIG. 4.

Figure 5:
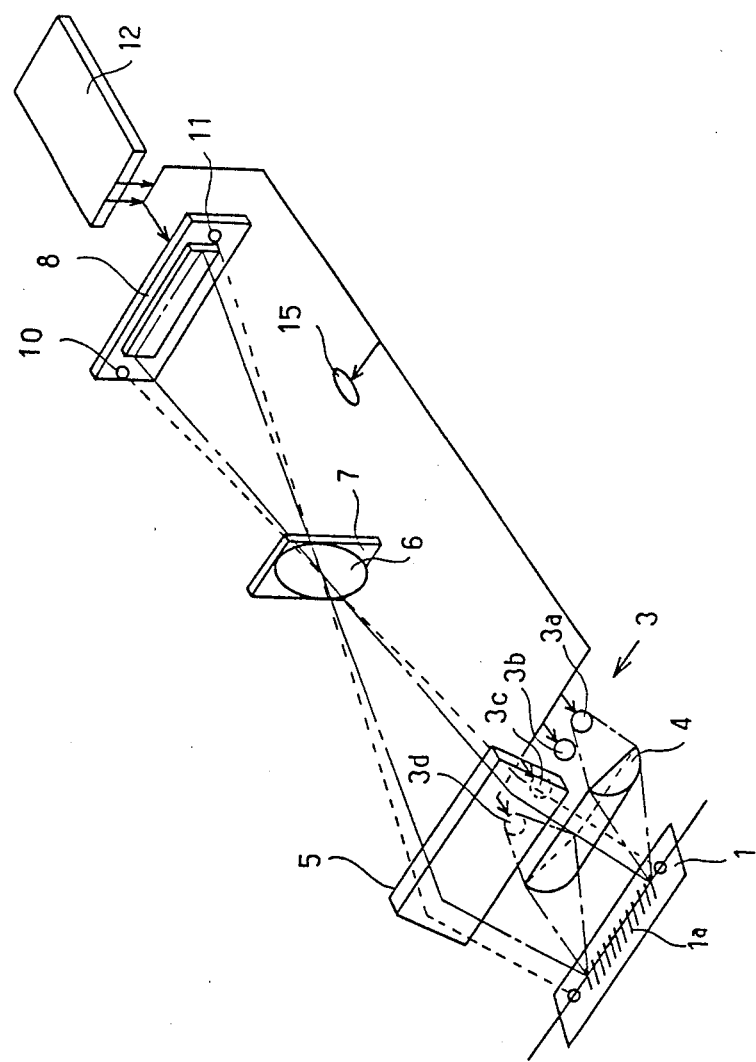
FIG. 5 is a schematical diagram showing a fourth embodiment according to the present invention.

The fourth embodiment of this invention is shown in FIG. 5. In this embodiment, a manual switch 15 is provided for timing the start of the reading operation of bar code 1a by reading sensor 8. The control circuit 12 upon receiving a signal from switch 15, turns reading sensor 8 on and LEDs 10 and 11 off so that reading sensor 8 can work correctly with no effect by light from LEDs 10 and 11 while performing the reading operation. During the focusing operation, LEDs 10 and 11 are turned on and sensor 8 is turned off by control circuit 12.

Figure 6:
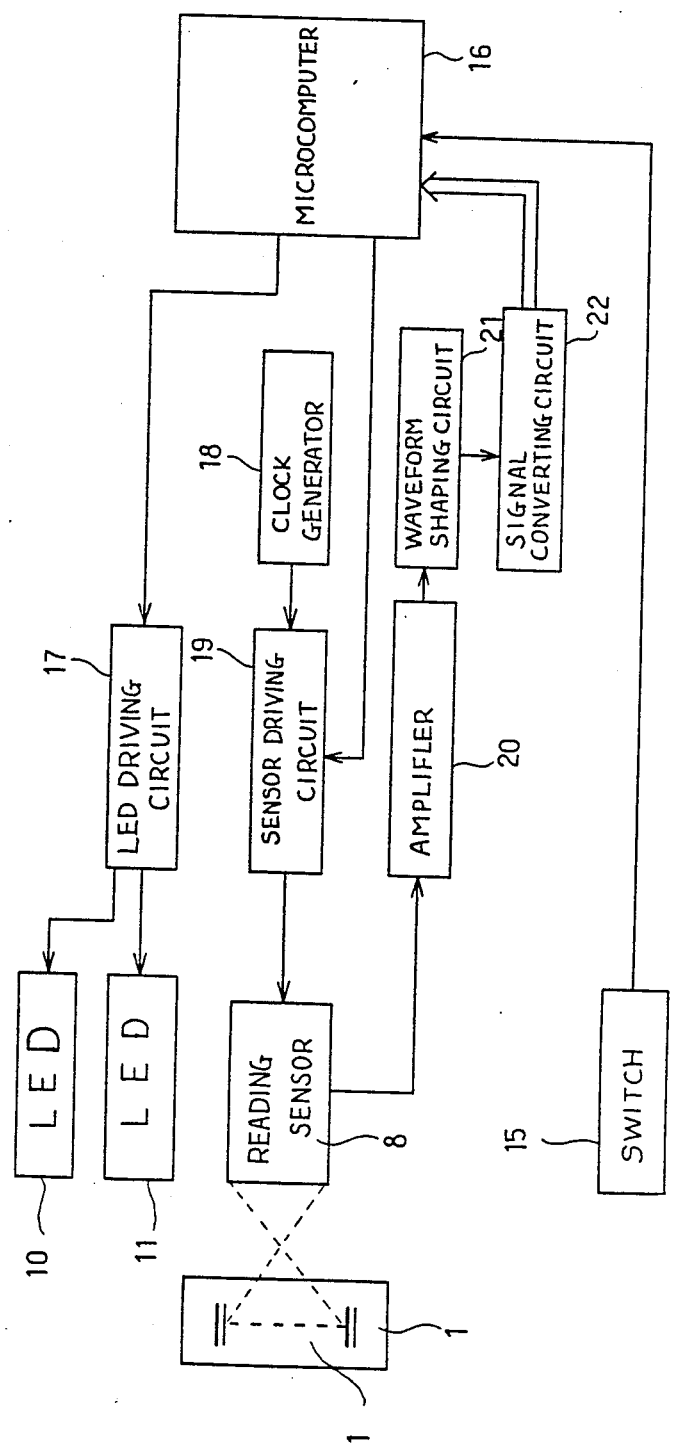
FIG. 6 is a circuit diagram showing the whole circuit of the apparatus shown in FIG. 5.

A circuit diagram showing the main part of an electric circuit of the optical information apparatus is shown in FIG. 6. In FIG. 6, a microcomputer 16 produces a signal for turning on LEDs 10 and 11 via an LED driving circuit 17 at the initial operation thereof when switch 15 is off.

Figure 7:
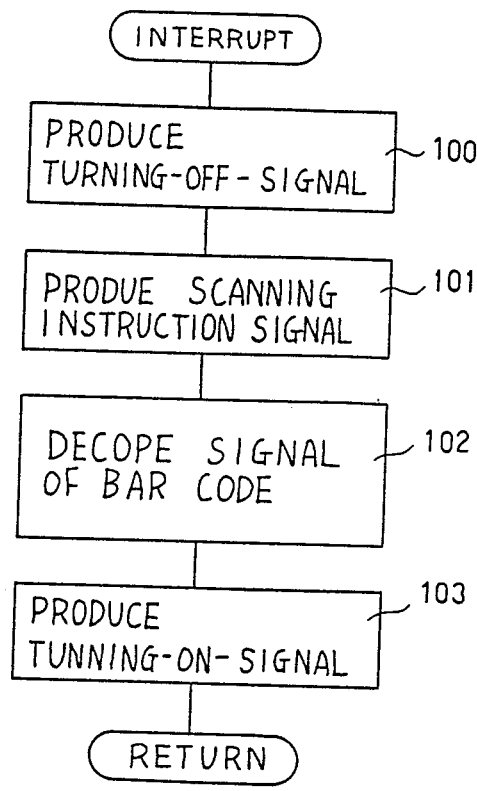
FIG. 7 is a flowchart showing the operation of a microcomputer of FIG. 6.

Provided that switch 15 in FIG. 6 is turned on to start the reading operation of bar code 1a, microcomputer 16 receives a signal from switch 15 and starts to perform interrupt operations in accordance with the flowchart of FIG. 7. Firstly, at step 100, a signal for turning off LEDs 10 and 11 is produced for LED driving circuit 17, which then turns off LEDs 10 and 11. At the next step 101, a scanning instruction signal to allow reading sensor 8 to perform the electronic scanning operation is produced to a sensor driving circuit 19. The sensor driving circuit 19 gates clock pulses necessary for driving reading sensor 8 based on clock pulses received from a clock generator 18 while receiving the scanning instruction signal from microcomputer 16.

Amplifier 20 amplifies the electric signal obtained from reading sensor 8 by scanning in a conventional manner. The waveform of the output signal from amplifier 20 is shaped by waveform shaping circuit 21 which includes a sample-and-hold circuit for sample-holding a peak value of the output signal from amplifier 20 and converting the output signal into a continuous signal. A signal converting circuit 22 converts the waveform shaped signal from waveform shaping circuit 21 into a binary signal having high and low levels respectively corresponding to the black and white bars. The binary signal is applied to microcomputer 16.

In step 102 of FIG. 7, the binary signal from signal converting circuit 22 is input and then decoded to read the content of bar code 1a. After the decoding operation is finished, the scanning instruction signal to sensor driving circuit 19 is stopped. At the next step 103, a signal for turning on LEDs 10 and 11 is produced to LED driving circuit 17, which then turns on LEDs 10 and 11.

Figure 8:
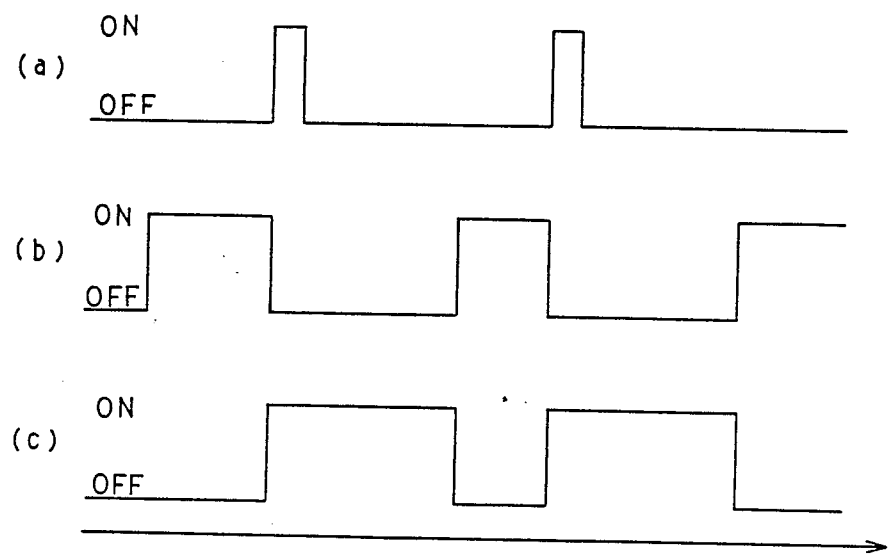
FIGS. 8 (a) through 8(c) are timing charts useful for understanding the operation of the fourth embodiment.

According to the above-mentioned operation, when switch 15 is turned on as shown in FIG. 8(a), LEDs 10 and 11 are turned off as shown in FIG. 8(b) reading sensor 8 performs the reading operation as shown in FIG. 8(c). After the reading operation is finished, LEDs 10 and 11 are turned on again.

The amount of time LEDs 10 and 11 are turned off may be constant and long enough to finish the reading operation by reading sensor 8. Instead of providing switch 15, LEDs 10 and 11 may be controlled to turn on and off periodically so that the reading operation by reading sensor 8 is performed while LEDs 10 and 11 are turned off.

LEDs 10 and 11 need to be positioned on substantially the same plane as a light receiving plane of reading sensor 8. Therefore, LEDs 10 and 11 may be positioned on reading sensor 8 and outside of the reading portion thereof, or fixed to casing 2 as long as being positioned on the above-mentioned plane. The LEDs 10 and 11 may be positioned at other places which are not on the scanning line of reading sensor 8 in order to suggest only the focus condition of this handheld reader. The light from that plane may be emitted through mirrors disposed on circuit board 9 instead of being directly emitted from LEDs 10 and 11. Further, LEDs 10 and 11 may be made in the form of a line instead of a dot, respectively.

Further, although the optically readable information above-described is in the form of a bar code 1a, the optically readable information instead may be in the form of symbols or characters.

In addition, a two-dimensional image sensor may be used instead of the one-dimensional image sensor as reading sensor 8.

Some exemplary embodiments of this invention have been described in detail above, but those skilled in the art will readily appreciate that many modifications are possible in the preferred embodiments without materially departing from the novel teachings and advantages of this invention. Accordingly, all such modifications are intended to be included within the scope of this invention as defined by the following claims.

What is claimed is:

1. Apparatus for reading optically readable information, which reflects light comprising:
   a casing having an opening for facing optical information;
   optical means, disposed in said casing, for imaging at a predetermined reading position in said casing an image of optically readable information facing said opening by light reflected therefrom;
   reading sensor means, disposed at said predetermined reading position and having a light receiving plane, for converting said image into an electrical signal; and
   light emitting means, positioned in said casing and substantially the same plane as said light receiving plane of said reading sensor means, for emitting light through at least part of said optical means to allow determination of focus of an image of said emitted light near optically readable information facing said opening.

2. Apparatus according to claim 1, wherein said light emitting means includes at least one light emitter positioned adjacent said reading sensor means.

3. Apparatus according to claim 1, wherein said light emitting means comprises a pair of light emitters positioned on both sides of a reading portion of said reading sensor means.

4. Apparatus according to claim 3, wherein said reading sensor means comprises a one-dimensional image sensor and said pair of light emitters are positioned on a scanning line of said image sensor.

5. Apparatus according to claim 4, wherein said pair of light emitters are LEDs.

6. Apparatus according to claim 5, further, comprising means for illuminating said optically readable information when said opening faces said optically readable information.

7. Apparatus according to claim 1, further comprising means for illuminating said optically readable information when said opening faces said optically readable information.

8. Apparatus according to claim 7, wherein said light emitting means comprises optical fibers for leading light from said illuminating means and for emitting light from both sides of a reading portion of said reading sensor means.

9. Apparatus according to claim 8, wherein said reading sensor comprises a one-dimensional image sensor and said optical fibers emits light from a scanning line of said image sensor.

10. Apparatus according to claim 1, further comprising means for disabling said light emitting means from emitting light at least while said reading sensor means converts said images of said optical information into said electrical signal.

11. Apparatus according to claim 10, wherein said light emitting means comprises a pair of light emitting parts positioned on both sides of a reading portion of said reading sensor means.

12. Apparatus according to claim 11, wherein said reading sensor means comprises a one-dimensional image sensor and said pair of light emitting parts are positioned on a scanning line of said image sensor.

13. Apparatus according to claim 10, further comprising a switch manually operated for starting the converting operation of said reading sensor means.

14. Apparatus for reading optically readable information, which reflects light comprising:
    a casing having an opening for facing optical information;
    optical means, disposed in said casing, for imaging at a predetermined reading position in said casing an image of optically readable information facing said opening by light reflected therefrom;
    reading sensor means, disposed at said predetermined reading position and having a light receiving plane, for converting said image into an electrical signal; and
    light emitting means, positioned in said casing on opposite ends of a scanning line of said reading sensor means and on substantially the same plane as said light receiving plane for positioning said image within the said scanning line and for emitting light through at least part of said optical means to allow determination of focus of an image of said emitted light at opposite ends of optically readable information facing said opening.

* * * * *